Aug. 22, 1933.  J. LUTON  1,924,081
METHOD AND APPARATUS FOR MAKING MOLDS
Filed Dec. 12, 1930  2 Sheets-Sheet 1

INVENTOR.
John Luton
BY Slough and Canfield
ATTORNEYS

Aug. 22, 1933.  J. LUTON  1,924,081
METHOD AND APPARATUS FOR MAKING MOLDS
Filed Dec. 12, 1930  2 Sheets-Sheet 2

INVENTOR.
John Luton
BY Slough and Canfield
ATTORNEYS

Patented Aug. 22, 1933

1,924,081

UNITED STATES PATENT OFFICE 1,924,081

METHOD AND APPARATUS FOR MAKING MOLDS

John Luton, Cleveland Heights, Ohio, assignor, by mesne assignments, to The Consolidated Iron-Steel Manufacturing Company of 1932, Cleveland, Ohio Application December 12, 1930
Serial No. 501,844

47 Claims. (Cl. 22—193)

This invention relates to the art of founding and particularly to methods and apparatus for making molds of sand or like for casting in metal.

It is one of the objects of this invention to provide an apparatus and method for producing molds by which a saving in the time and/or in the labor costs thereof as compared with prior methods and apparatus may be effected.

Another object is to provide an apparatus and method for producing molds in which a division of labor may be effected, the necessary operations to produce a mold being divided up among a plurality of laborers instead of all being performed successively by a single laborer.

Another object is to provide an apparatus and method for producing molds wherein molds may be produced by relatively unskilled labor or by labor less skilled than has heretofore been necessary.

Another object is to provide an apparatus and method for producing molds whereby the making of molds may be carried on in a continuously repeating cycle of operations from a plurality of patterns.

Another object is to provide an apparatus and method for the making of molds by a continuous cycle of operations from a plurality of patterns some of which patterns may be all alike as when the maximum rate of production of a single kind of casting is desired; or which patterns may be a diversified group of patterns as when only one or only a few patterns of any one kind are available.

Another object is to provide an apparatus for making molds according to an improved method which will be simple and cheap to construct; and which will be simple and easy to operate and efficient in operation.

Other objects will be apparent to those skilled in the art to which my invention appertains.

My invention is fully disclosed in the following description taken in connection with the accompanying drawings, in which.

Referring to the drawings, I have shown generally at 1 a trackway comprising a pair of spaced rails 2 and 3 secured to and supported upon a plurality of trestles 4, 4. The trackway illustrated is circular but this is not essential to my invention inasmuch as it may be of other configurations, but is preferably of closed formation, thus providing a continuous, unbroken trackway. The construction of the trackway 1 may be varied but preferably I construct the rails 2 and 3 of angle iron, one flange being disposed vertically to provide a rail proper and the other horizontally to provide a support and means to secure the rail to the trestles 4.

A plurality of carriages, one of which is indicated generally at 6, is provided, each comprising generally a bed 7 preferably constructed from metal and in the form of a hollow rectangular frame providing an interior perforation or opening therethrough, 8. On its underside the bed 7 is provided with a plurality, such as four, wheels 9 by which the carriage is adapted to roll on the rails 2 and 3.

Figures 10, 12:
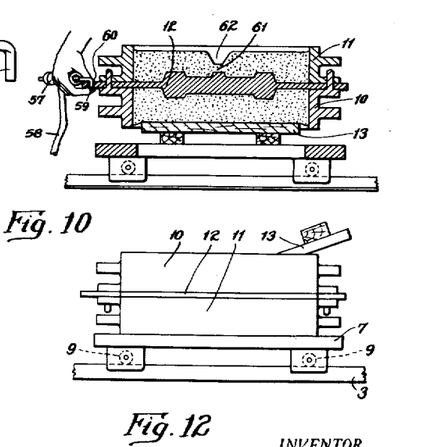
Fig. 10 is a fragmentary view to an enlarged scale taken from the plane 10 of Fig. 1 and with some of the parts in cross-section, and illustrating the mode of performing a certain operation.
Fig. 12 is a fragmentary view to an enlarged scale taken from the plane 12 of Fig. 1.

For each of the carriages 6 I provide a molding flask and a pattern. The flask are preferably of the snap-flask type and in the practice of my invention illustrated in the drawings, the pattern is of the match-plate type. The complete carriage equipment is illustrated in Fig. 12, the parts being viewed in side elevation and besides the bed 7 there is shown the drag-flask 10, the cope-flask 11 and the match-plate pattern 12, these parts being generally illustrated in the form in which they are commonly used in founding practice.

Each of the carriages 6 and its flask-equipment and pattern equipment just described is propelled successively to a number of stations around the trackway 1 at which molding operations to be described are performed. The start of the progressive movement of the carriages may be considered as beginning when the carriage is in the position indicated in broken lines at 14 in Fig. 1. At or adjacent the station 14, a supply of follow boards is provided, and as each carriage rolls along to this station, a follow board such as indicated at 13 in Fig. 12 is laid on or in the flask ready for use.

Figures 1, 2, 4, 5, 6:
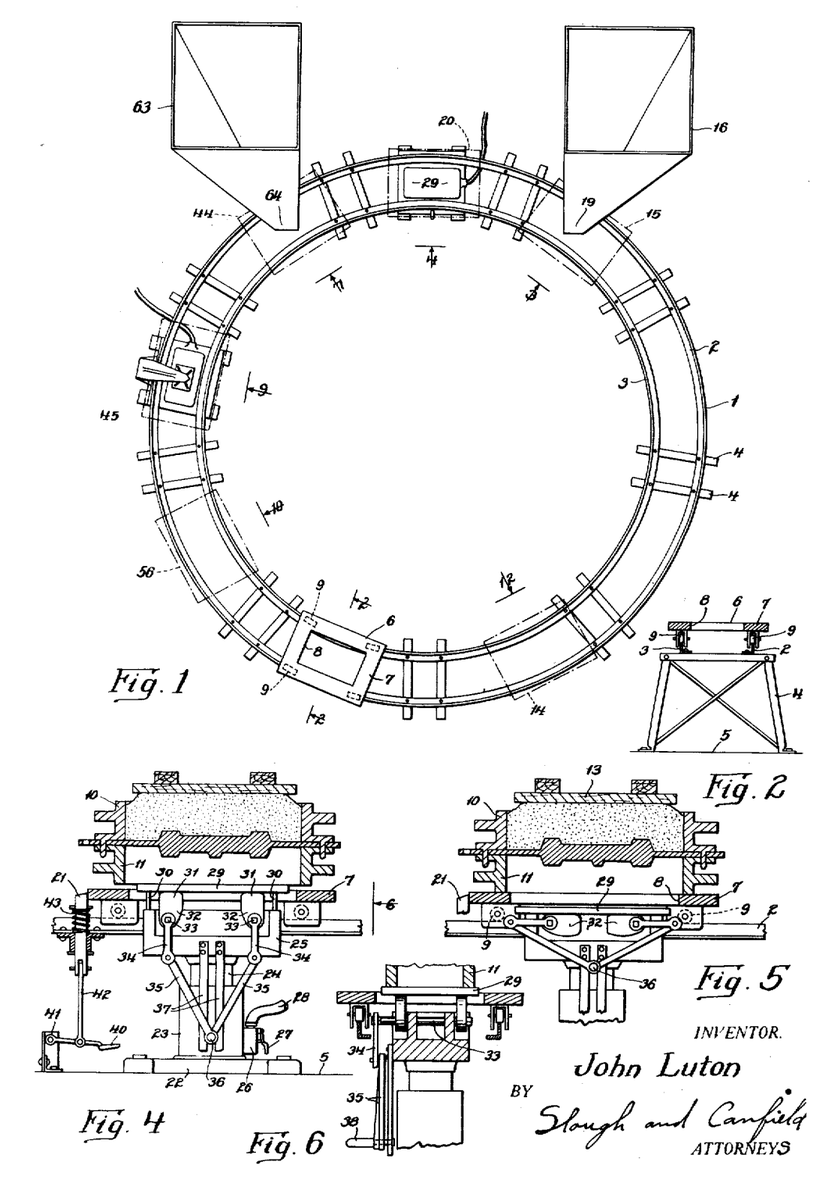
Fig. 1 is a plan view from above of an apparatus embodying my invention, the view being in some respects diagrammatic.
Fig. 2 is a cross-sectional view to an enlarged scale taken from the plane 2—2 of Fig. 1.
Fig. 4 is a fragmentary view to an enlarged scale taken approximately from the plane 4 of Fig. 1 and with some of the parts in cross-section.
Fig. 5 is a view similar to Fig. 4 with parts broken away for simplicity and with parts in different operative positions from those shown in Fig. 4.
Fig. 6 is a view of a part of Fig. 4 taken approximately from the plane 6.

The carriages are moved from one station to another by the operators, a number of whom are necessary, some of whom may preferably stand within the trackway 1 and others outside the same.

Starting from the station 14, the carriage is moved around to the station indicated in broken lines at 15 where it is stopped by the operator.

Figure 3:
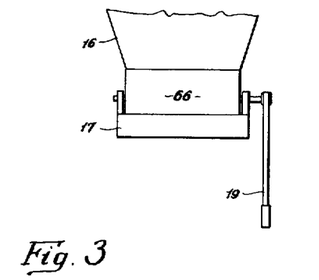
Fig. 3 is a fragmentary view taken approximately from the plane 3 of Fig. 1 with some of the parts in section and some of the parts broken away.

Immediately above the station 15 is a hopper 16 in which is stored for use a quantity of molding sand or like material which has previously been conditioned and screened ready for use in the making of a mold. The lower end of the hopper 16 as shown in Fig. 3 is normally closed by a gate construction comprising a pair of gates 17 and 18 adapted to be operated by a lever 19 disposed above the station 15 and within convenient reaching distance of the operator at that station.

Upon operation of the lever 19 by the operator, the gates 17 and 18 are displaced and sand may flow from the hopper.

The exact construction of the gates 17 and the mechanism for operating them by the lever 19 forms no essential part of my invention. The gate construction illustrated generally in the drawings will be recognized as of a type known in the prior art. Before operating the lever 19, the carriage is moved on the trackway 1 to position the flask directly under the spout 66 of the hopper, the parts then being in the position illustrated in Fig. 3, in which figure it will be noted that the cover board 13 has temporarily been removed by the operator. Upon operating the lever 19, sand will fall out of the spout 66 as indicated in Fig. 3, filling the drag-flask 10. When sufficient sand has been dropped into the flask, the operator rolls the carriage and the flask along to the station indicated in broken lines at 20 in Fig. 1, the correct position for the carriage at this station being determined by a stop 21 against which the carriage abuts, see Figs. 4 and 5. The operator then lays on top of the sand in the flask the follow board 13, above referred to. The parts then appear as in Fig. 5, the carriage and its flask being supported by the wheels 9 on the rails, the rail 2 only in this figure being shown. By means of the stop 21 above mentioned, the carriage and flask are accurately stopped directly over a mechanism known in the founding art as a jolter, which will now be described, with reference to Figs. 4 and 5.

The jolter comprises a supporting base 22 having an upwardly open cylinder 23 in which is disposed a vertically reciprocable piston 24 surmounted by a head 25. A valve housing 26 on the side of the cylinder 23 houses a valve operable by an external lever 27. Upon operating the lever 27, compressed air is admitted by conduit 28, through the valve housing 26 and into the cylinder 23 to raise the piston 24 and head 25 and is then exhausted, permitting the head 25 and piston 24 to fall against a rigid stop or abutment thus communicating a severe shock or jolt to the head 25, and by the automatic action of the valves in the housing 26, these jolts continue in rapid succession as long as the lever 27 is held in the operated position.

The parts of the jolter thus far described are well known in the art and jolters of this description are commonly employed to jolt sand-filled flasks resting directly on the head 25 to compact the sand therein on the pattern. In the practice of my invention, however, I employ a jolter having other features and performing other functions which will now be described.

At 29 is illustrated a supplemental head mounted on the head 25 and adapted to be moved to an elevated position as indicated in Fig. 4 or depressed to a normal position, illustrated in Fig. 5, its movements being guided by depending pins 30 on the supplemental head 29 and corresponding guideways not shown in the head 25.

The supplemental head 29 may be raised or lowered by the lobes 31 of cams 32 on shafts 33, rotatably supported in the head 25. To rotate the shafts 33, cranks 34 are secured thereto connected to toggle arms 35—35 pivotally connected together at 36. The pivot connection 36 is adapted to be guided vertically by guides 37 and a handle 38 is provided at the pivot connection 36 for elevating or depressing that connection. The parts thus described are normally in the position shown in Fig. 5. Upon depressing the pivot connection 36, the shaft 33 will be rotated, moving the cam 32 to the position of Fig. 4, thus elevating the supplemental head 29.

Elevation of the head 29 projects it upwardly through the opening 8 in the bed 7 of the carriage, causing it to engage the lower edge of the cope-flask 11 as shown in Fig. 6, and to lift the entire flask construction from the bed 7 of the carriage. Now, upon operation of the valve lever 27, the jolting operation above described will be performed, the shock or jolt being transmitted to the supplemental head 29 through the shaft 33 and cam 32, and the flask will be jolted.

By the construction provided, the flask when jolted is supported independently of the trackway 1 having been completely lifted therefrom.

At the completion of the jolting operation, the handle 38 of the jolter mechanism is elevated thus rocking the cams 32—32 to the position of Fig. 5, depressing the head 29 and transferring the flask back to the carriage bed 7, the supplemental head 29 coming to rest below the bed 7.

It will be understood, of course, that the bed 7 is supported by the wheels 9 sufficiently high above the trackway 1 to pass over the parts of the jolter when in the position of Fig. 5 and the wheels 9 of the carriage may be spaced apart laterally to straddle the jolter or any parts thereof which project upwardly through the trackway. Thus when the jolter is in the position of Fig. 5, the carriage may freely roll over it to take up the position of Fig. 5 and to abut against the stop 21. After the completion of the jolting operation just described, the carriage may be moved on to the next station.

Preferably, the stop 21 is adapted to be depressed by a pedal 40 pivoted to a suitable support 41 and connected to the stop 21 by a connecting rod 42. The stop 21 may be of any suitable construction but is preferably vertically movable and constrained to take up an uppermost or stopping position by a spring 43, which spring is compressed to withdraw downwardly the stop 21 upon depression of the pedal 40 in a manner which will readily be understood.

Figure 7:
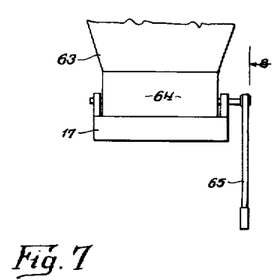
Fig. 7 is a view to an enlarged scale taken from the plane 7 of Fig. 1 and with some of the parts in cross-section.
Figure 8:
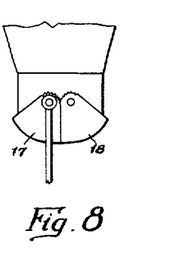
Fig. 8 is a fragmentary view taken approximately from the plane 8 of Fig. 7.

After completing the jolting operation, and before moving the carriage on to the next station, the operator picks up the two parts of the flask and turns them upside down on the carriage bed 7, the parts then appearing as in Fig. 7, where as seen, the cover board 13 rests directly on the carriage bed 7 and the two parts of the flask 11 and 10 are supported by the sand in the drag-flask 10.

The operator then moves the carriage to the next station indicated generally in broken lines at 44, directly over which station is another sand hopper 63 having a spout 64 which may be of the same or similar construction as the hopper 16 and spout 19 described above in connection with Figs. 1 and 3. Upon operating a lever 65, sand will be discharged from the spout 64 and into the cope-flask 11 as shown in Fig. 7, and after filling of the flask, the carriage is moved on by the operator to the station indicated in broken lines at 45, Fig. 1, where the carriage is stopped by another stop or abutment 46, see Fig. 9, which may be similar to and operated similarly to the stop 21 of Fig. 4 to accurately position the bed 7 of the carriage and the opening 8 therein relative to the head 47 of a machine or apparatus of the type known in the founding art as a squeezer.

Figure 9:
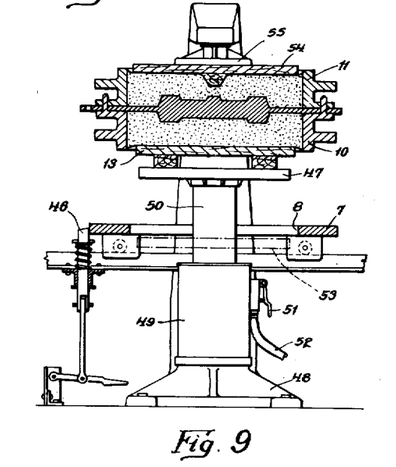
Fig. 9 is a view to an enlarged scale taken approximately from the plane 9 of Fig. 1 with parts in cross-section and with parts broken away for clearness.

The squeezer comprises a supporting base 48, a cylinder 49 thereon, a piston 50 in the cylinder, on which the head 47 is supported. By means of a lever 51, compressed air may be admitted from a conduit 52 to the cylinder 49 to elevate the piston and head 47.

When the carriage is first moved to the station 45, Fig. 1, the head 47 of the squeezer is in the depressed position indicated in broken lines at 53, Fig. 9, and the carriage bed 7 may pass freely over it into its position defined by the stop 46. The follow board 13 at that time rests on the bed 7. Upon upward movement of the head 47, from the position 53, it picks up the follow board 13 and the flask and carries them upward. In the meantime a sprue mold board 54 has been laid on the sand in the cope-flask 11. Continued upward movement of the head 47 carries the sprue mold board 54 in to engagement with an upper stationary head 55 of the squeezer, and finally squeezes the sand between the two boards 54 and 13 for the well known purpose, particularly to compact the sand in the cope-flask 11.

Upon releasing the lever 51, the air exhaust from the cylinder 49 and the head 47 and the parts supported thereon descend, the head moving to the position 53 and transferring the flask to the carriage bed 7.

The stop 46 is then removed in the manner referred to and the carriage is rolled on to the next station, which is indicated in Fig. 1 by broken lines at 56, and the carriage and its supported parts appear generally as illustrated in Fig. 10.

Figure 11:
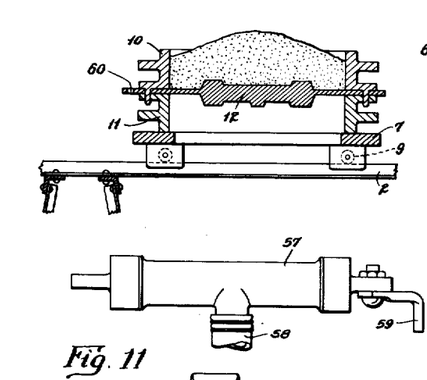
Fig. 11 is a view to an enlarged scale of one of the parts illustrated in Fig. 10.

The sprue mold board 54 was removed from the carriage by the operator at the squeezer station 45 for use on succeeding flasks. The remaining sand at 61 between the pattern and the sprue mold 62 may be removed in the usual manner before or after the carriage is moved to station 56. The operations to be performed at the station 56 are those of taking the flask apart, removing the match-plate, putting the flask together again, and then removing the flask, leaving the finished mold on the follow board 13, upon which it is supported and carried away to be laid in line with other molds ready to be cast. These operations may be performed in any suitable manner, but I prefer to proceed as follows: A vibrator or stripper is applied to the match-plate to vibrate the same, and while being vibrated, the cope-flask 11 is lifted off of the pattern and then the pattern is removed and the cope-flask restored to its position on the drag-flask 10, and the two flasks preferably of the snap type may then be removed. The vibrating or stripper device may be of any preferred form but I prefer to employ that illustrated in Figs. 10 and 11. An elongated housing 57 contains moving parts adapted to be rapidly moved to vibrate the housing 57 by compressed air admitted thereto from a compressed air conduit 58. Such devices in the prior practice are rigidly and permanently attached to a portion of the match-plate projecting outwardly between the halves of the flask. The stripper which I preferably employ, however, has secured to the housing 57 a finger 59 extending therefrom in a transverse direction. And the match-plate 12 is provided, as shown in Fig. 10, with a vertically disposed perforation 60. In operation, the housing 57 is grasped by the operator in one hand as shown in Fig. 10, and the finger 59 is inserted downwardly through the perforation 60. The operator then depresses the housing 57, causing the finger 59 to rigidly engage the match-plate 12.

By means of a valve not shown but which may be operated by the operator's foot or knee, the compressed air is admitted through the conduit 58 and vibrations set up in the housing 57 are transmitted directly through the finger 59 to the match-plate 12, vibrating the same and causing it to strip from the sand during disassembling operation above described.

At the station 56, if the mold to be made is one requiring cores to be inserted, these may be put in place before returning the two halves of the mold together.

After removing or carrying away the mold and follow board upon which it is supported, the two parts of the flask and the pattern are placed on the carriage as shown in Fig. 12 and are ready to progressively move around through a second cycle of operations such as those just described, another follow board 13 being added to the parts on the carriage at or adjacent the station 14.

The various operations hereinbefore described may be divided up among a number of laborers in various ways. I prefer, however, to have one operator performing the operations at stations 15 and 20, another operator performing the operations at stations 44 and 45, two operators performing the operations at 56 and in some cases an additional operator to set cores at that station. This is the preferred minimum number of operators. If desired, other operators may be added to the crew to take the used parts from station 56 and re-assemble them in good order and to add the follow board 13 ready for the operator at station 15.

In the foregoing description and in the drawings, I have not shown means for conditioning the sand nor for elevating it to and depositing it in the hoppers 16 and 63. Apparatus well known in the founding art has been provided which may be employed for this purpose.

As described hereinbefore, the carriages and their molding flasks are moved from station to station by the operators at the stations. If desired however, movement from station to station may be effected by mechanical means. In some instances it may be desired to employ a trackway 1 of relatively large diameter in which case, there may be a relatively great traveling distance between the station 56 and the station 15, and the movement of the carriages over all or a part of this distance may be effected by traveling conveying means such as a chain or the like well known in the art in connection with conveying apparatus, continuous process apparatus etc.

My invention is not limited to the exact details of construction shown and described. Many changes in and modifications of the embodiment hereinbefore set forth may be made within the scope and spirit of my invention without sacrificing its advantages.

The subject matter shown and described but not claimed herein may be claimed in co-pending applications, Serial Nos. 682,137, 682,138, 682,139 and 682,140, all filed July 25, 1933, and which are continuations of the instant application.

I claim:—

1. The method of making sand molds with a pattern and a flask which includes repeatedly circulating the flask and pattern in a continuous closed path successively to a plurality of stations serially disposed in the path and performing thereon different successive operations at the different stations to form a complete mold, to separate the pattern and flask from the mold to form another mold therewith and so on continuously.

2. The method of making a sand mold with a pattern and a flask which includes moving the flask and pattern from a starting point in a continuous closed path to a plurality of stations serially disposed in the path and performing thereon different operations at the different stations, the operations including filling the flask with sand, mechanically jolting it, mechanically squeezing it, stripping and removing the pattern from the mold and removing the mold from the flask and returning the pattern and flask along the path to the starting point.

3. The method of making sand molds in quantities with a plurality of molding flasks and corresponding patterns which includes moving the flasks and patterns processionally along a continuous closed path from a starting point in the path through a plurality of stations serially disposed and performing thereon different operations at the different stations, completing the mold and removing it from the flasks and continuing the movement of the flasks and pattern around the path to the starting point.

4. In an apparatus for making molds, a molding flask provided with a pattern and a supporting carrier therefor, a closed guideway along which the carrier is adapted to travel, a plurality of pieces of operable apparatus disposed serially along the guideway whereby a plurality of operators stationed along the guideway may perform on the flask successive mold-producing operations and return the carrier with the flask and pattern to the starting point of travel.

5. In an apparatus for making molds, a mold flask provided with a pattern, a continuous closed guideway along which the flask is adapted to travel, a plurality of pieces of operable apparatus and material supply depots disposed serially along the guideway whereby a plurality of operators disposed along the guideway may perform on the flask and pattern successive mold-producing operations, and whereby the flask and pattern after the completion of one mold may be caused to continue traveling around the guideway for the making of other molds continuously.

6. In an apparatus for making molds, a plurality of mold flasks provided each with a pattern, a continuous closed guideway along which the flasks are adapted to travel processionally, a plurality of pieces of operable apparatus and material supply depots disposed serially along the guideway, whereby a plurality of operators disposed along the guideway may perform on each flask and pattern successively mold-producing operations, and whereby each flask and pattern after the completion of one mold may be caused to continue to travel around the guideway for the making of other molds continuously.

7. In an apparatus for making molds, a flask, a flask-supporting carriage, a guideway upon which the carriage is adapted to travel for the performance on the flask along the line of travel at different stations of different molding operations, a mechanism disposed at one of the stations for performing a molding operation and auxiliary supporting means for supporting the flask independently of the carriage during the operation of the mechanism.

8. In an apparatus for making molds, a flask, a flask-supporting carriage, a guideway upon which the carriage is adapted to travel for the performance on the flask at different stations disposed along the line of travel, of different molding operations, a mechanism disposed at one of the stations for performing a molding operation and comprising elevating means for elevating the flask above the carriage for the performance of the operation.

9. In an apparatus for making molds, a flask, a flask-supporting carriage, a guideway upon which the carriage is adapted to travel for the performance on the flask at different stations disposed along the line of travel, or different molding operations, a jolter mechanism at one of the stations for performing the jolting operation, and comprising means for removing the flask from the carriage before jolting it.

10. In an apparatus for making molds, a flask, a flask-supporting carriage, a guideway upon which the carriage is adapted to travel for the performance on the flask at different stations disposed along the line of travel, of different molding operations, a squeezer mechanism at one of the stations for performing a squeezing operation, and comprising means for removing the flask from the said carriage before performing the squeezing operation.

11. In an apparatus for making molds, a flask provided with a pattern, flask-supporting means upon which the flask is adapted to travel for the performance thereon at different stations disposed along the line of travel, of different molding operations, stripper means at one of the stations for vibrating the pattern during the stripping operation performed at that station, comprising a pattern element projecting exteriorly from the flask, a movable vibratory mechanism, and locking means for detachably rigidly locking the vibratory mechanism to and supporting it upon the pattern element to vibrate the pattern.

12. In an apparatus for making molds, a flask provided with a pattern, flask-supporting means upon which the flask is adapted to travel for the performance thereon at different stations disposed along the line of travel, of different molding operations, stripper means at one of the stations for vibrating the pattern during the stripping operation performed at that station, comprising a pattern element projecting exteriorly from the flask, a perforation in the pattern element, a vibratory mechanism, a frame supporting the mechanism, a handle on the frame, a pin element rigidly secured to the frame and adapted to be removably inserted into the perforation and to be rigidly locked to the pattern element to transmit vibration thereto by manually applying a tilting movement to the frame.

13. In an apparatus for making molds, a flask, a trackway, a carriage adapted to support the flask thereupon and to travel on the trackway, an opening in the carriage below the flask, a mechanism for performing a molding operation on the flask disposed adjacent the trackway and over which the carriage is adapted to travel, and auxiliary supporting means associated with the mechanism adapted to operate through said opening and to support the flask independently of the carriage during performance of the molding operation thereon.

14. In a founding jolter, a head adapted to support a flask, a mechanism for jolting the head to jolt a flask thereon, and mechanism for raising and lowering the head relative to the jolting mechanism and a rigid supporting element movable to a position between the head and jolting mechanism to transmit jolts from the mechanism to the head when the head is in an elevated position.

15. In a founding jolter, a head adapted to support a flask, a mechanism for jolting the head to jolt a flask thereon, mechanism for raising and lowering the head relative to the jolting mechanism and a rigid element movable to a position between the head and the jolting mechanism by operation of the raising and lowering mechanism and the jolting mechanism being adapted to jolt the head through the rigid element when the head is in an elevated position.

16. In an apparatus for making molds, a flask, a flask supporting carriage, a trackway upon which the carriage is adapted to travel for the performance on the flask of different molding operations successively at different stations disposed along the trackway, a jolter mechanism at one of the stations for performing on the flask the jolting operation and comprising means for elevating the flask above the carriage before jolting it.

17. In an apparatus for making molds, a flask, a flask supporting carriage, a trackway comprising a pair of rails, and upon which the carriage is adapted to travel for the performance on the flask of different molding operations successively at different stations disposed along the trackway, a jolted mechanism at one of the stations for performing the jolting operation, and comprising means disposed between the rails for elevating the flask above the carriage before jolting it.

18. In an apparatus for making molds, a flask, a trackway, a flask-supporting carriage on the trackway adapted to travel therealong to successive stations disposed along the trackway for the performance on the flask of successive molding operations, a jolted mechanism at one of the stations for performing the jolting operation, and comprising means operative upwardly through the trackway and through said carriage for elevating the flask from the carriage before jolting it.

19. In an apparatus for making molds, a flask, a flask supporting carriage, a trackway upon which the carriage is adapted to travel successively to a plurality of stations disposed along the trackway for the performance on the flask of successive molding operations, a squeezer mechanism disposed at one of the stations for performing a squeezing operation, and comprising means for elevating the flask from the carriage before performing the squeezing operation.

20. In an apparatus for making molds, a flask, a flask supporting carriage, a trackway comprising a pair of spaced substantially parallel rails, upon which the carriage is adapted to travel successively to a plurality of stations disposed along the trackway for the performance on the flask of different successively molding operations, a squeezer mechanism at one of the stations for performing a squeezing operation, and comprising means operative upwardly between the rails for elevating the flask from the carriage before performing the squeezing operation.

21. In an apparatus for making molds, a flask, a trackway, a carriage on the trackway supporting the flask, and adapted to travel along the trackway to a plurality of successive stations disposed along the trackway for the performance on the flask of different molding operations successively, a squeezer mechanism at one of the stations for performing a squeezing operation, and comprising means operative upwardly through the trackway and through the carriage for elevating the flask from the carriage before performing the squeezing operation.

22. In an apparatus for making molds, a flask, a flask supporting board, a conveying means upon which the board and supported flask are adapted to travel for performance on the flask along the line of travel at different stations, of different molding operations, a mechanism disposed at one of the stations for performing a molding operation and comprising means for supporting the board and flask independently of the conveyor means during the operation of the mechanism.

23. In an apparatus for making molds, a flask, a flask supporting board, a conveying means upon which the board and supported flask are adapted to travel for performing on the flask along the line of travel at different stations, of different molding operations, a mechanism disposed at one of the stations for performing a molding operation and comprising means for elevating the board and flask above the conveyor during the performance of the operation.

24. In an apparatus for making molds, a flask and a supporting board therefor, a supporting conveyor upon which the board and flask may travel, an opening in the conveyor below the board, a mechanism for performing a molding operation on the flask disposed adjacent the conveyor and over which the board is adapted to travel, and the molding mechanism comprising means operable through the said opening to support the board and flask independently of the conveyor during the performance of the molding operation thereon.

25. The method of making a sand mold with a pattern and a flask which includes moving the flask in a closed path upon an antifriction conveyor mechanism to a plurality of stations serially disposed in the path and performing thereon different operations at the different stations, and at one or more of the stations supporting the flask independently of the antifriction conveyor while performing the operation thereon.

26. In an apparatus for making molds, a flask, a conveying and supporting apparatus upon which the flask may be conveyed to and supported in a squeezing position at a squeezing station, a flask squeezing mechanism at the station comprising a head adapted to support the flask, a second head, and mechanism for effecting relative movement between the heads to squeeze a mold in the flask therebetween, and for effecting vertical relative movement between the first head and the supporting apparatus at the station to cause the flask to be supported by the said head independently of the said supporting apparatus during the squeezing operation.

27. In an apparatus for making molds, a flask, a conveying and supporting apparatus upon which the flask may be conveyed to and supported in a squeezing position at a squeezing station, a flask squeezing mechanism at the station comprising a squeezing head adapted to support the flask, a second head, and mechanism for effecting relative movement between the heads to squeeze a mold in the flask therebetween, and for transferring the support of the flask from the supporting apparatus at the station to the first-mentioned head to cause the flask to be squeezed without transmission of the squeezing pressure to the supporting apparatus.

28. In an apparatus for making molds, a flask, a conveying and supporting apparatus upon which the flask may be conveyed to and supported in a squeezing position at a squeezing station, a flask squeezing mechanism at the station comprising a squeezing head adapted to support the flask, a second head, and mechanism for effecting relative movement between the heads to squeeze a mold in the flask therebetween, and for effecting vertical relative movement of the first-mentioned head and the supporting apparatus at the station to cause the head to project upwardly through the supporting apparatus at the station whereby the support of the flask may be transferred from the supporting apparatus to the first-mentioned head and to cause it to be squeezed without transmitting the squeezing pressure to the supporting apparatus.

29. In an apparatus for making molds, a flask, a conveying and supporting apparatus upon which the flask may be conveyed to and supported in a squeezing position at a squeezing station, and comprising rotary anti-friction supporting elements, a flask squeezing mechanism at the station comprising a squeezing head adapted to support the flask, a second head, and mechanism for effecting relative movement between the heads to squeeze a mold in the flask therebetween, and for effecting relative vertical movement of the first-mentioned head and the supporting apparatus at the station to cause the flask to be supported by the said head independently of the said supporting apparatus whereby the flask may be squeezed without transmitting the squeezing pressure to the rotary supporting elements at the station.

30. In an apparatus for making molds, a flask, a conveying and supporting apparatus upon which the flask may be conveyed to and supported in a squeezing position at a squeezing station, and comprising rotary anti-friction supporting elements, a flask squeezing machine at the station comprising a squeezing head adapted to support the flask, a second head, and mechanism for effecting relative movement between the heads to squeeze a mold in the flask therebetween and for effecting vertical relative movement of the head and supporting apparatus at the station to cause the head to project upwardly through the supporting apparatus at the station, and for transmitting the support of the flask from the rotary supporting elements at the station to the first-mentioned head whereby the flask may be squeezed without transmitting the squeezing pressure to the rotary supporting elements.

31. In an apparatus for making molds, a flask, a conveying and supporting apparatus upon which the flask may be conveyed to and supported in a jolting position at a jolting station, a flask jolting mechanism at the station comprising a jolting head adapted to support the flask, mechanism for effecting vertical relative movement between the head and supporting apparatus at the station to cause the flask to be supported by the head independently of the said supporting apparatus.

32. In an apparatus for making molds, a flask, a conveying and supporting apparatus upon which the flask may be conveyed to and supported in a jolting position at a jolting station, a flask jolting mechanism at the station comprising a jolter head adapted to support the flask, mechanism for transferring the support of the flask from the supporting apparatus at the station to the jolter head whereby it may be jolted without jolting the supporting apparatus.

33. In an apparatus for making molds, a flask, a conveying and supporting apparatus upon which the flask may be conveyed to and supported in a jolting position at a jolting station, a flask jolting mechanism at the station comprising a jolter head adapted to support the flask, means effecting vertical relative movement of the head and supporting apparatus at the station to cause the head to project upwardly through the supporting apparatus at the station whereby the support of the flask may be transferred from the supporting apparatus to the jolter head and whereby it may be jolted without jolting the supporting apparatus.

34. In an apparatus for making molds, a flask, a conveying and supporting apparatus upon which the flask may be conveyed to and supported in a jolting position at a jolting station, and comprising rotary anti-friction supporting elements, a flask jolting mechanism at the station comprising a jolting head adapted to support the flask, mechanism for effecting relative vertical movement of the head and supporting 1,924,081

7 apparatus at the station to cause the flask to be supported by the head independently of the said supporting apparatus whereby the flask may be jolted without jolting the rotary supporting elements at the station.

35. In an apparatus for making molds, a flask, a conveying and supporting apparatus upon which the flask may be conveyed to and supported in a jolting position at a jolting station, and comprising rotary anti-friction supporting elements, a flask jolting machine at the station comprising a jolter head adapted to support the flask, mechanism for effecting vertical relative movement of the head and supporting apparatus at the station to cause the head to project upwardly through the supporting apparatus at the station, mechanism for transferring the support of the flask from the rotary supporting elements at the station to the jolter head whereby the flask may be jolted without jolting the rotary supporting elements.

36. In an apparatus for making molds, a flask, a conveying and supporting apparatus upon which the flask may be conveyed to and supported in a squeezing position at a squeezing station, a flask squeezing mechanism at the station comprising a flask supportable head, a second head, and mechanism for effecting relative movement between the heads to squeeze both sides of a mold in the flask therebetween, and for effecting vertical relative movement between the first head and the supporting apparatus at the station to cause the flask to be supported by the said head independently of the said supporting apparatus during the squeezing operation and to cause the pressure on both sides of the mold to be equalized.

37. In an apparatus for making molds, a flask, a conveying and supporting apparatus upon which the flask may be conveyed to and supported in a squeezing position at a squeezing station, a flask squeezing mechanism at the station comprising a flask supportable squeezing head, a second head, and mechanism for effecting relative movement between the heads to squeeze both sides of a mold in the flask therebetween, and for transferring the support of the flask from the supporting apparatus at the station to the first mentioned head to cause the flask to be squeezed without transmission of the squeezing pressure to the supporting apparatus and to cause the pressure on both sides of the mold to be equalized.

38. In an apparatus for making molds, a flask, a conveying and supporting apparatus upon which the flask may be conveyed to and supported in a squeezing position at a squeezing station, a flask squeezing mechanism at the station comprising a flask supportable squeezing head, a second head, and mechanism for effecting relative movement between the heads to squeeze both sides of a mold in the flask therebetween, and for effecting vertical relative movement of the first-mentioned head and the support of the supporting apparatus at the station to cause the head to project upwardly through the supporting apparatus at the station whereby the support of the flask may be transferred from the supporting apparatus to the first-mentioned head and to cause it to be squeezed without transmitting the squeezing pressure to the supporting apparatus, and to cause the pressure on both sides of the mold to be equalized.

39. In an apparatus for making molds, a flask, a conveying and supporting apparatus upon which the flask may be conveyed to and supported in a squeezing position at a squeezing station, and comprising rotary anti-friction supporting elements, a flask squeezing mechanism at the station comprising a flask supportable squeezing head, a second head, and mechanism for effecting relative movement between the heads to squeeze both sides of a mold in the flask therebetween, and for effecting relative vertical movement of the first-mentioned head and the supporting apparatus at the station to and the flask to be supported by the said head cause the flask to be supported by the said head independently of the said supporting apparatus whereby the flask may be squeezed without transmitting the squeezing pressure to the rotary supporting elements at the station and the pressure on both sides of the mold may be equalized.

40. In an apparatus for making molds, a flask, a conveying and supporting apparatus upon which the flask may be conveyed to and supported in a squeezing position at a squeezing station, and comprising rotary anti-friction supporting elements, a flask squeezing machine supporting elements, a flask squeezing machine at the station comprising a flask supportable squeezing head, a second head, and mechanism for effecting relative movement between the heads to squeeze both sides of a mold in the flask therebetween and for effecting vertical relative movement of the head and supporting apparatus at the station to cause the head to project upwardly through the supporting apparatus at the station, and for transmitting the support of the flask from the rotary supporting elements at the station to the first-mentioned head whereby the flask may be squeezed without transmitting a squeezing pressure to the rotary supporting elements and whereby the pressure on both sides of the mold may be equalized.

41. The method of making sand molds with a pattern and a flask which includes repeatedly circulating the flask and pattern in a continuous closed path successively to a plurality of stations serially disposed in the path, repeatedly associating one of a plurality of follow boards with the circulating flask and pattern at a predetermined point in the path and performing on the flask and pattern and board different successive operations at the different stations to form a complete mold, supported on the board, and to separate the pattern and the flask from the mold and board, and removing the mold and board from the circulation.

42. In an apparatus for making molds, a flask, a conveying and supporting apparatus upon which the flask may be conveyed to and supported in a squeezing position at a squeezing station, a flask squeezing mechanism at the station comprising a squeezing head adapted to support the flask, a second head, and mechanism for effecting relative movement between the heads to squeeze both sides of a mold in the flask therebetween, and for transferring the support of the flask from the supporting apparatus to the first-mentioned head to at the station to the first-mentioned head to cause the flask to be squeezed without transmission of the squeezing pressure to the supporting apparatus and to cause the pressure on both sides of the mold to be equalized, and for effecting relative movement between the heads after the squeezing operation, for transferring the support of the flask from the first-mentioned head to the supporting apparatus.

43. In an apparatus for making molds, a flask, a conveying and supporting apparatus upon which the flask may be conveyed to and supported in a squeezing position at a squeezing station, and comprising rotary anti-friction supporting elements, a flask squeezing mechanism at the station comprising a head adapted to support the flask, a second head, and mechanism for effecting relative movement between the heads to squeeze both sides of a mold in the flask therebetween, and for effecting relative vertical movement of the first-mentioned head and the supporting apparatus at the station to cause the flask to be supported by the said head independently of the said supporting apparatus whereby the flask may be squeezed without transmitting the squeezing pressure to the rotary supporting elements at the station, and the pressure on both sides of the mold may be equalized, and for effecting relative vertical movement of the first-mentioned head and the supporting apparatus after the squeezing operation to cause the flask to be supported by the rotary supporting elements of the supporting apparatus.

44. In an apparatus for making molds, a flask, a conveying and supporting apparatus upon which the flask may be conveyed to and supported in a squeezing position at a squeezing station, a flask squeezing mechanism at the station comprising a squeezing head adapted to support the flask, a second head, and mechanism for effecting relative movement between the heads to squeeze a mold in the flask therebetween, and for transferring the support of the flask from the supporting apparatus at the station to the first-mentioned head to cause the flask to be squeezed without transmission of the squeezing pressure to the supporting apparatus, and for effecting relative movement between the heads after the squeezing operation to transfer the support of the flask from the first-mentioned head to the supporting apparatus.

45. In an apparatus for making molds, a flask, a conveying and supporting apparatus upon which the flask may be conveyed to and supported in a squeezing position at a squeezing station, and comprising rotary anti-friction supporting elements, a flask squeezing mechanism at the station comprising a squeezing head adapted to support the flask, a second head, and mechanism for effecting relative movement between the heads to squeeze a mold in the flask therebetween, and for effecting relative vertical movement of the first-mentioned head and the supporting apparatus at the station to cause the flask to be supported by the said head independently of the said supporting apparatus whereby the flask may be squeezed without transmitting the squeezing pressure to the rotary supporting elements at the station, and for effecting relative vertical movement of the first-mentioned head and the supporting apparatus after the squeezing operation to cause the flask to be supported by the supporting apparatus.

46. In an apparatus for making molds, a flask, a conveying and supporting apparatus upon which the flask may be conveyed to and supported in a jolting position at a jolting station, a flask jolting mechanism at the station comprising a jolter head adapted to support the flask, mechanism for transferring the support of the flask from the supporting apparatus at the station to the jolter head whereby it may be jolted without transmitting the jolting movement to the supporting apparatus, and for transferring the support of the flask after the jolting operation from the jolter head to the supporting apparatus.

47. In an apparatus for making molds, a flask, a conveying and supporting apparatus upon which the flask may be conveyed to and supported in a jolting position at a jolting station, and comprising rotary anti-friction supporting elements, a flask jolting mechanism at the station comprising a jolter head adapted to support the flask, mechanism for effecting relative vertical movement of the head and supporting apparatus at the station to cause the flask to be supported by the head independently of the said supporting apparatus whereby the flask may be jolted without transmitting a jolting movement to the rotary supporting elements at the station, and for effecting relative vertical movement of the head and supporting apparatus after the jolting operation to cause the flask to be supported by the rotary supporting elements of the supporting apparatus.

JOHN LUTON.

CERTIFICATE OF CORRECTION.

Patent No. 1,924,081.　　　　　　　　　　　　　　　August 22, 1933.

JOHN LUTON.

It is hereby certified that error appears in the printed specification of the above numbered patent requiring correction as follows: Page 1, line 106, for "flask" read flasks; page 4, line 70, claim 3, for "flasks" read flask; and page 6, line 21, claim 25, before "while" insert mechanism; and that the said Letters Patent should be read with these corrections therein that the same may conform to the record of the case in the Patent Office.

Signed and sealed this 14th day of November, A. D. 1933.

F. M. Hopkins (Seal)　　　　　　　　　　　　　　　　　　Acting Commissioner of Patents.

which the flask may be conveyed to and supported in a squeezing position at a squeezing station, and comprising rotary anti-friction supporting elements, a flask squeezing mechanism at the station comprising a head adapted to support the flask, a second head, and mechanism for effecting relative movement between the heads to squeeze both sides of a mold in the flask therebetween, and for effecting relative vertical movement of the first-mentioned head and the supporting apparatus at the station to cause the flask to be supported by the said head independently of the said supporting apparatus whereby the flask may be squeezed without transmitting the squeezing pressure to the rotary supporting elements at the station, and the pressure on both sides of the mold may be equalized, and for effecting relative vertical movement of the first-mentioned head and the supporting apparatus after the squeezing operation to cause the flask to be supported by the rotary supporting elements of the supporting apparatus.

44. In an apparatus for making molds, a flask, a conveying and supporting apparatus upon which the flask may be conveyed to and supported in a squeezing position at a squeezing station, a flask squeezing mechanism at the station comprising a squeezing head adapted to support the flask, a second head, and mechanism for effecting relative movement between the heads to squeeze a mold in the flask therebetween, and for transferring the support of the flask from the supporting apparatus at the station to the first-mentioned head to cause the flask to be squeezed without transmission of the squeezing pressure to the supporting apparatus, and for effecting relative movement between the heads after the squeezing operation to transfer the support of the flask from the first-mentioned head to the supporting apparatus.

45. In an apparatus for making molds, a flask, a conveying and supporting apparatus upon which the flask may be conveyed to and supported in a squeezing position at a squeezing station, and comprising rotary anti-friction supporting elements, a flask squeezing mechanism at the station comprising a squeezing head adapted to support the flask, a second head, and mechanism for effecting relative movement between the heads to squeeze a mold in the flask therebetween, and for effecting relative vertical movement of the first-mentioned head and the supporting apparatus at the station to cause the flask to be supported by the said head independently of the said supporting apparatus whereby the flask may be squeezed without transmitting the squeezing pressure to the rotary supporting elements at the station, and for effecting relative vertical movement of the first-mentioned head and the supporting apparatus after the squeezing operation to cause the flask to be supported by the supporting apparatus.

46. In an apparatus for making molds, a flask, a conveying and supporting apparatus upon which the flask may be conveyed to and supported in a jolting position at a jolting station, a flask jolting mechanism at the station comprising a jolter head adapted to support the flask, mechanism for transferring the support of the flask from the supporting apparatus at the station to the jolter head whereby it may be jolted without transmitting the jolting movement to the supporting apparatus, and for transferring the support of the flask after the jolting operation from the jolter head to the supporting apparatus.

47. In an apparatus for making molds, a flask, a conveying and supporting apparatus upon which the flask may be conveyed to and supported in a jolting position at a jolting station, and comprising rotary anti-friction supporting elements, a flask jolting mechanism at the station comprising a jolter head adapted to support the flask, mechanism for effecting relative vertical movement of the head and supporting apparatus at the station to cause the flask to be supported by the head independently of the said supporting apparatus whereby the flask may be jolted without transmitting a jolting movement to the rotary supporting elements at the station, and for effecting relative vertical movement of the head and supporting apparatus after the jolting operation to cause the flask to be supported by the rotary supporting elements of the supporting apparatus.

JOHN LUTON.

CERTIFICATE OF CORRECTION.

Patent No. 1,924,081.  August 22, 1933.

JOHN LUTON.

It is hereby certified that error appears in the printed specification of the above numbered patent requiring correction as follows: Page 1, line 106, for "flask" read flasks; page 4, line 70, claim 3, for "flasks" read flask; and page 6, line 21, claim 25, before "while" insert mechanism; and that the said Letters Patent should be read with these corrections therein that the same may conform to the record of the case in the Patent Office.

Signed and sealed this 14th day of November, A. D. 1933.

F. M. Hopkins (Seal)  Acting Commissioner of Patents.

CERTIFICATE OF CORRECTION.

Patent No. 1,924,081.                                                      August 22, 1933.

JOHN LUTON.

It is hereby certified that error appears in the printed specification of the above numbered patent requiring correction as follows: Page 1, line 106, for "flask" read flasks; page 4, line 70, claim 3, for "flasks" read flask; and page 6, line 21, claim 25, before "while" insert mechanism; and that the said Letters Patent should be read with these corrections therein that the same may conform to the record of the case in the Patent Office.

Signed and sealed this 14th day of November, A. D. 1933.

F. M. Hopkins (Seal)                                                       Acting Commissioner of Patents.